UNITED STATES PATENT OFFICE.

FREDERICK W. SPERR, JR., OF OAKMONT, AND ROBERT J. MONTGOMERY, OF TARENTUM, PENNSYLVANIA, ASSIGNORS TO H. KOPPERS COMPANY, OF PITTSBURGH, PENNSYLVANIA, A CORPORATION OF MAINE.

CEMENT.

1,221,618.  Specification of Letters Patent.  Patented Apr. 3, 1917.

No Drawing.   Application filed March 7, 1916.   Serial No. 82,616.

*To all whom it may concern:*

Be it known that we, FREDERICK W. SPERR, Jr., and ROBERT J. MONTGOMERY, both citizens of the United States, residing, respectively, in Oakmont and Tarentum, both in the county of Allegheny and State of Pennsylvania, have invented a new and useful Improvement in Cements, of which the following is a full, clear, and exact description.

Our invention is designed to provide an improved refractory cement, or cement mixture, which may be used for a variety of purposes, but which we have found to be especially useful in repairing the leaky walls of by-product ovens, gas retorts, and other furnaces, for the purpose of stopping such leaks and putting the masonry in good condition without the necessity of tearing it down and rebuilding it.

Our invention is further designed to provide a cement of this character which is strongly adherent; which will possess the property of drying with comparatively little shrinkage; which will form a hard impervious joint after it has been heated to a relatively high temperature; and which is of a nature not to flux the brickwork in connection with which it is used. Our improved cement may also be given substantially the same coefficient of expansion and contraction as the brickwork with which it is employed.

Our improved cement consists of a mixture of silica, fire clay, and feldspar. The clay in this mixture is preferably used in the proportion of from 15 to 25 per cent.; the feldspar in a proportion not to exceed 7 per cent., and the silica constituting the remainder. We have found that it is advantageous to have about half of the silica in the form of previously burned high silicious material, such as hard silica bats.

We have obtained excellent results from the following specific mixture, although we do not limit our invention to the particular proportions therein stated:

Fire clay_____ 25 per cent.
Ground silica_____ 35 per cent.
Silica bats_____ 35 per cent.
Feldspar_____ 5 per cent.

The material should be ground to a degree of fineness to suit the conditions under which it is to be applied. For injecting into fine cracks, it should preferably all be ground so as to pass through a 100-mesh sieve; and for ordinary purposes it is advisable to grind it so that it will all pass through a 20-mesh sieve.

In use the material is mixed with water to the desired consistency.

We claim:

1. A cement mixture, comprising silica, hard silica bats, fire clay and feldspar.

2. A cement mixture, comprising 15 to 25 per cent. of fire clay, feldspar not exceeding 7 per cent., and silica.

3. A cement mixture, comprising approximately 25 per cent. of fire clay, 35 per cent. of silica, 35 per cent. of silica bats, and 5 per cent. of feldspar.

In testimony whereof, we have hereunto set our hands.

FREDERICK W. SPERR, JR.
ROBERT J. MONTGOMERY.

Witnesses:
W. C. LYON,
H. M. CORWIN.